(12) United States Patent
Mariappan et al.

(10) Patent No.: US 11,107,078 B2
(45) Date of Patent: Aug. 31, 2021

(54) SYSTEM AND METHOD FOR ELECTRONIC FUNDS TRANSFER (EFT) SECURITY

(71) Applicant: MASTERCARD INTERNATIONAL INCORPORATED, Purchase, NY (US)

(72) Inventors: Murugalakshmanan Mariappan, New York, NY (US); Joshua J. Baron, Hoboken, NJ (US); Todd Healy, Brooklyn, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/029,156

(22) Filed: Jul. 6, 2018

(65) Prior Publication Data

US 2020/0013059 A1 Jan. 9, 2020

(51) Int. Cl.
*G06Q 40/00* (2012.01)
*G06Q 20/40* (2012.01)
*G06Q 20/32* (2012.01)

(52) U.S. Cl.
CPC ....... *G06Q 20/401* (2013.01); *G06Q 20/3278* (2013.01)

(58) Field of Classification Search
CPC .... G06Q 10/0639; G06Q 20/36; G06Q 20/40; H04L 63/0442
(Continued)

(56) References Cited

U.S. PATENT DOCUMENTS

2003/0145205 A1* 7/2003 Sarcanin ................ G06Q 20/02
713/172

2008/0046334 A1 2/2008 Lee et al.
(Continued)

FOREIGN PATENT DOCUMENTS

WO 2013082190 A1 6/2013

OTHER PUBLICATIONS

E-Commerce Security Issues : 2014 International Conference on Future Internet of things and Cloud pp. 197-201.Author. Mohammed Ladan ISBN 978-1-4799-4357-9 (Year: 2014).*
(Continued)

*Primary Examiner* — Bruce I Ebersman
*Assistant Examiner* — John A Anderson
(74) *Attorney, Agent, or Firm* — Howard IP Law Group, PC

(57) ABSTRACT

A computer system is configured to provide a payment card security application programming interface (API) for providing a payment card security score to a partner entity computer system. Responsive to receipt of user identification data for a card holder from the partner entity computer system via the API, the computer system retrieves payment card electronic funds transfer (EFT) transaction data records corresponding to the card holder, and determines a transaction type and security level associated for the user's transactions. The computer system generates, based on the determined security level for each of the transactions, a security score for the card holder. The partner entity computer system provides the user identification data for the card holder to the payment card security API responsive to receipt of an authorization request for a new transaction. The partner entity computer system may determine whether to approve or deny the new payment card EFT transaction based upon the security score.

14 Claims, 9 Drawing Sheets

(58) Field of Classification Search
USPC .......................................................... 705/35
See application file for complete search history.

(56) References Cited

U.S. PATENT DOCUMENTS

| | | |
|---|---|---|
| 2009/0307778 A1 | 12/2009 | Mardikar |
| 2010/0325035 A1* | 12/2010 | Hilgers .................. G06Q 10/10 705/38 |
| 2015/0019443 A1 | 1/2015 | Sheets et al. |
| 2017/0161747 A1* | 6/2017 | Einhorn ............... G06Q 20/322 |

OTHER PUBLICATIONS

International Search Report and Written Opinion dated Sep. 24, 2019 for related PCT Application No. PCT/US2019/035321.

* cited by examiner

Step 1: The customer pays with a payment card. The customer purchases goods/services from a merchant.

Step 2: The payment is authenticated. The merchant point-of-sale system captures the customer's account information and securely sends it to the acquirer.

Step 3: The transaction is submitted. The merchant acquirer asks the payment card EFT system to get an authorization form the customer's issuing bank.

Step 4: Authorization is requested. Payment card EFT system submits the transaction to the issuer for authentication.

Step 5: Authorization response. The issuing bank authorizes the transaction and routes the response back to the merchant.

Step 6: Merchant payment. The issuing bank routes the payment to the merchant's acquirer who deposits the payment in the merchant's account.

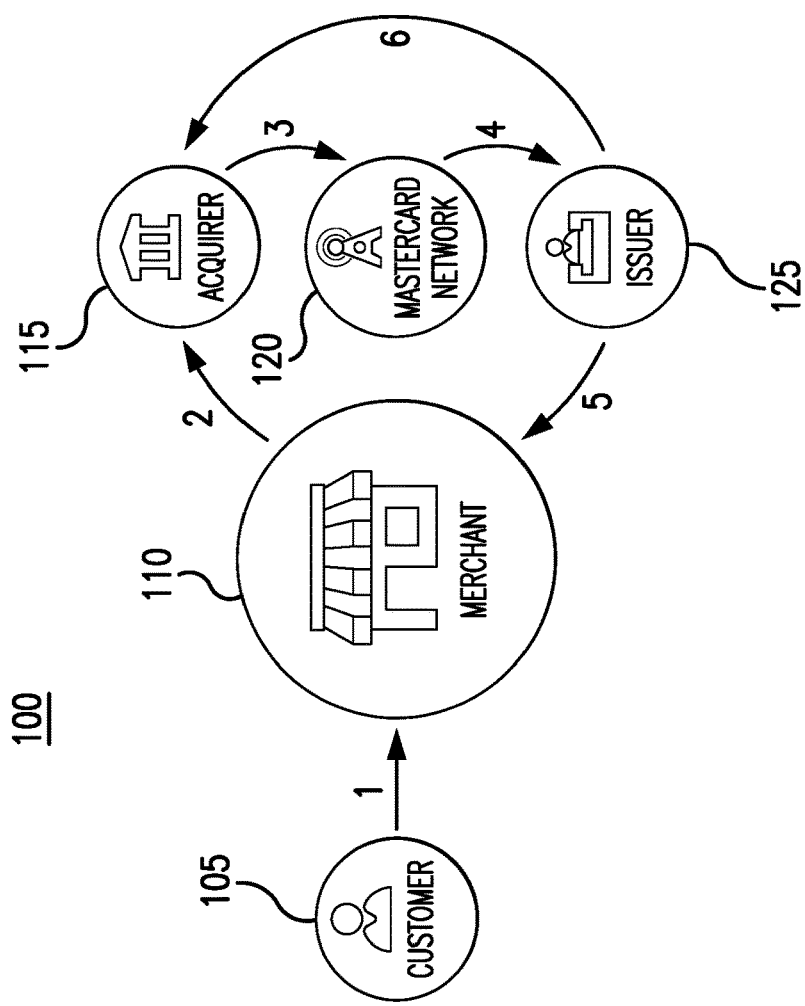

PARTNER BANK  Accounts ˅  Payment & Transfers ˅  Rewards & Benefits ˅  More ˅  [ Hi Todd! > ]

Bank Rewards Credit Card ...3456  [ Manage Account > ]

| Current Balance | Available Credit | Rewards Earned | Minimum Amount Due |
|---|---|---|---|
| $XX,XXX | $XX,XXX | XX,XXX | $XX,XXX Due on XX/XX/XX |

[ Pay Bill → ]

Quick Links
Statements >
Offers >
Open an Account>

| Secure Transactions (since last statement) 2 Device 7 Connected Merchant 4 SRC 17 of 47 transactions were secure Learn More > | Connected Devices [ Add Devices + ] | Connected Merchants  3  Settings > | Fast ACH  ( ON ◯ )  Settings > |
|---|---|---|---|

Credit Score
710
POOR — GOOD
Learn More >

810

[ All transactions > ]  [ Search ]  ⊡

| Date | Description | Security | Type | Amount | Balance |
|---|---|---|---|---|---|
| Jan 20, 2018 | Netflix | [Advice △] | Entertainment | $10.99 | $1453.01 |
| Jan 18, 2018 | Lillies Bar & Restaurant | | Restaurant | $24.57 | $1442.02 |
| Jan 18, 2018 | Bonnie's Diner | | Restaurant | $33.32 | $1417.45 |
| Jan 17, 2018 | Hulu | [Advice △] | Entertainment | $8.99 | $1384.13 |
| Jan 14, 2018 | Trader Joe's | 830 | Grocery | $124.87 | $1375.14 |
| Jan 13, 2018 | Starbucks | | Restaurant | $6.64 | $1250.27 |
| Jan 10, 2018 | Dunkin'Donuts | | Restaurant | $2.29 | $1243.63 |
| Jan 2, 2018 | Uber | [Advice △] | Transportation | $13.21 | $1241.34 |

SYSTEM AND METHOD FOR ELECTRONIC FUNDS TRANSFER (EFT) SECURITY

CROSS-REFERENCE TO RELATED APPLICATIONS

None.

FIELD OF INVENTION

Embodiments of the present disclosure relate to systems and methods for securing electronic funds transfers (EFTs) associated with payment card EFT transactions.

BACKGROUND

Cashless electronic payment for transaction of goods and services has become ubiquitous in modern society. To make cashless electronic payments, consumers often make payments using a credit card, debit card, or pre-paid card, etc. Card holder-initiated transactions using a payment card are a type of electronic funds transfer (EFT). The terms "payment card transactions," "payment card EFT transactions," payment card electronic transfer fund (EFT) transactions," and electronic fund transfer (EFT) payment card transactions," and variants, are used interchangeably herein.

Given the overwhelming volume of payment card EFT transactions consummated per second, and the necessity that transactions be authorized expeditiously in order to be an acceptable form of payment for all parties involved in the transaction, the circumstances naturally lend themselves to automation of the approval process. However, the use and transmission of clearly transmitted credit or debit card numbers invites theft and unauthorized use of the accounts. For example, transaction details such as the consumer's credit card number that are required to consummate the consumer's transaction may be subject to electronic interception or redirection for malicious purposes. In addition, data breaches have been commonplace on the Internet, with such breaches exposing consumer identifiers such as credit card numbers, account numbers, and social security numbers. Further, any bad actor in the purchase and approval process with access to a credit card used in a transaction may simply copy the data for later unauthorized use.

Tokenization may be used to increase the security of payment card EFT transactions. Tokenization is the process of substituting a sensitive data element, such as a credit card number, with a non-sensitive equivalent, referred to as a token, that has no extrinsic or exploitable meaning or value. The token is a reference (i.e. identifier) that maps back to the sensitive data through a tokenization system. The mapping from original data to a token uses methods which render tokens infeasible to reverse in the absence of the tokenization system, for example using tokens created from random numbers. The tokenization system provides data processing applications with the authority and interfaces to request tokens, or detokenize back to sensitive data. A system and method for transaction data tokenization is disclosed in United States Patent Application Publication No. 2013-0297504A1, the entirety of which is incorporated by reference herein.

While systems have been created to implement tokenization for credit and debit card EFT transactions, consumers nevertheless still perform many payment card transactions by methods that involve the submission of clearly transmitted credit card numbers, such as by inputting their credit card data into an interface or swiping the magnetic strip of their credit card at a point-of-sale device.

The recited embodiments address an inherently technological problem which arises with payment card electronic funds transfers (EFTs) because credit and debit cards are able to be used in several different ways—such as by clear transmission of card data, by use of a chip card embedded in the card, by use of near-field chip in the card, by swiping the card, and by tokenization of the card data and submission of the token. Because the technology provides the card holder with so many choices in the use of the card, card holders often are not sure which methods are most secure, and instead often use the method that they have always used in the past, which is clear transmission or swiping. Often, card holders are not even aware of the security differences involved with the different methods of using credit and debit card data.

A technological configuration for providing issuing bank computer systems with an application program interface to obtain data concerning the security of the payment card EFT transactions initiated and performed by the card holder, which data can then be used to increase the usage of secure tokenized transactions rather than transactions involving clear transmission of card data, is desired.

SUMMARY

The conventional processing of payment card electronic funds transfer (EFT) transactions does not provide for the generation of security scores for card holders, nor does it provide the technological framework for providing information about insecure transactions to card holders. Embodiments of the disclosure teach a system and method that increases the security of payment card EFT transactions by leveraging technology to provide consumers and issuing bank computer systems with security data for card holders. First, the system is configured to provide security data for card holders to issuing bank computer systems via an Application Programming Interface. The system and method may also be configured to generate security level information for individual payment card EFT transactions by card holders, as well as an overall security score for a card holder, which may then be provided to the issuing bank computer system via the API. The issuing bank computer system may use the scoring information to provide graphical interfaces for the card holders which include the security data, which makes card holders more aware of the insecurity of certain transactions and more aware of payment card security in general. Further, the issuing bank computer system may use the scoring information when making authorization decisions. The unconventional implementation of a scoring engine, and the non-routine provision of scoring data to issuing bank computer systems via an API, constitute the unconventional application of technology to address the technological inability of prior art systems to provide card holders and issuing bank computer systems with security information. The unconventional system and method recited by the claims improves the technological techniques of identifying fraudulent transaction messages in a payment network by modifying the conventional flow to add a request back to an interchange system API from an issuing bank computer system, after receipt of a transaction request from the interchange system and before the provision of a responsive message for transmission to the merchant system.

In embodiments, the system and method may be configured to leverage technology to provide real-time notifications to card holders regarding insecure EFT payment methods. The system and method may be configured to provide real-time notification to an application on a card holder's mobile device (e.g., a payment card application), such as a notification that a payment card EFT transaction that has just been initiated is insecure. The notification may also include information suggesting higher security level transaction methods that may be used instead. In embodiments, the notification may be sent after denial of a transaction, with the notification indicating that use of a more secure method of payment is required. The issuing bank computer system may also be configured to provide security notifications or suggestions to card holders via mobile banking applications (made available by the issuing bank) on the card holder devices. The generation of real-time notifications concerning the security of methods of payment constitutes an unconventional practice effected through the implementation of the scoring engine and provision of the scoring data to the issuing computer system through the API.

In an embodiment, the payment card EFT transaction system may be configured to issue a fraud alert for transactions associated with a card holder who has a low security score or for transactions which have a low security level. The fraud alert may be transmitted to the issuing bank computer system to encourage the denial of the transaction. In other embodiments, the payment card EFT transaction system may effect denial of the transaction based upon the identification of fraud. The generation of the fraud alert, and application of the fraud information to deny authorization, constitute unconventional practices effected through the implementation of the scoring engine and provision of the scoring data to the issuing computer system through the API.

A system and method is provided for generating an API which provides access to data indicative of the security level of payment card EFT transactions performed by a cardholder. In embodiments, the system comprises one or more computer processors, a data warehouse, and a memory unit storing computer-executable instructions. The data warehouse may contain a plurality of payment card EFT transaction data records for a plurality of payment card EFT transactions for a plurality of card holders, wherein each of the plurality of payment card EFT transaction data records comprises data generated during execution of a payment card EFT transaction including data indicative of a payment card EFT transaction type for the payment card EFT transaction. The computer-executable instructions, when executed by the one or more computer processors, may cause the one or more computer processors to provide a payment card security application programming interface (API) for providing a partner entity computer system access to payment card security score data and receive, from the partner entity computer system via the payment card security API, user identification data for one of the plurality of card holders. Responsive to receipt of the user identification data, the instructions may also cause the one or more computer processors to retrieve, from the data warehouse, one or more of the payment card EFT transaction data records corresponding to the one of the plurality of card holders; determine, for each of the retrieved payment card EFT transaction data records based at least in part on the data indicative of the payment card EFT transaction type for the payment card EFT transaction, a security level associated with the retrieved payment card EFT transaction data record; and generate, based on the determined security level for each of the retrieved payment card EFT transaction data records, a security score for the one of the plurality of card holders. In embodiments, the partner entity computer system may be configured to provide the user identification data for the one of the plurality of card holders to the payment card security API responsive to receipt of a request for authorization of a new payment card EFT transaction for the one of the plurality of card holders. In addition, in embodiments, the partner entity computer system may be configured to determine whether to approve or deny the new payment card EFT transaction based upon the security score for the one of the plurality of card holders provided via the payment card security API.

In embodiments, the data indicative of the payment card EFT transaction type for the payment card EFT transaction may comprise one or more of Point of Sale Entry Mode Data, Token Requestor Identifier Data, and Wallet Identifier Data. The payment card EFT transaction type may comprise one of a physical magnetic swipe transaction type, a physical card with chip transaction type, a manual entry PAN transaction type, a mobile phone NFC transaction type, and a tokenized transaction with authentication transaction type. The partner entity computer system may be configured to generate, for display on a user computing device, a graphical user interface including the security score.

In an embodiment, the instructions may further cause the one or more computer processors to provide, via the payment card security API to the partner entity computer system, the determined security level for each of the retrieved payment card EFT transaction data records for the one of the plurality of card holders responsive to receipt of the user identification data from the partner entity computer system via the payment card security API. The partner entity computer system may be configured to generate, for display on a user computing device based upon the determined security level for each of the retrieved payment card EFT transaction data records, a graphical user interface including data indicative of a number of secure and insecure transactions performed by the one of the plurality of card holders.

In an embodiment, the system may further comprise a data storage device configured to store a security level associated with each of the plurality of payment card EFT transaction types, and determining, for each of the retrieved payment card EFT transaction data records, the security level associated with the payment card EFT transaction may comprise accessing the data storage device to determine the security level associated with the data indicative of the payment card EFT transaction type for the payment card EFT transaction. The data storage device may further comprise first data indicative of payment card EFT transaction types which are deemed secure transactions and second data indicative of payment card EFT transaction types that are deemed insecure transactions. Generating the security score for one of the plurality of card holders based on the determined security level for each of the retrieved payment card EFT transaction data records may comprise a memory unit including instructions which cause the one or more computer processors to: access the data storage device to determine for each payment card EFT transaction based on the data indicative of the payment card EFT transaction type for the payment card EFT transaction whether the payment card EFT transaction is deemed secure or insecure; determine a total number of payment card EFT transactions associated with the one of the plurality of card holders; and determine a first number of payment card EFT transactions of the total number of payment card EFT transactions which were secure and a second number of payment card EFT transactions of the total number of payment card EFT transactions which were insecure. The generated security score may be based upon the first number of the payment card EFT transactions that were secure and the second number of the payment card EFT transactions which were insecure.

In embodiments, the instructions, when executed by the one or more computer processors, may further cause the one or more computer processors to receive, from an acquiring bank computer system, the request for authorization for the new payment card EFT transaction for the one of the plurality of card holders, wherein the request includes the data indicative of the payment card EFT transaction type for the new payment card EFT transaction, and determine, based on the data indicative of the payment card EFT transaction type for the new payment card EFT transaction, the security level associated with the new payment card EFT transaction. The instructions may further cause the one or more processors to determine, based upon the security level associated with the new payment card EFT transaction and the security score for the one of the plurality of card holders, a fraud level associated with the new payment card EFT transaction, and responsive to a determination that the fraud level exceeds a predetermined threshold fraud level, transmit to one of the partner entity computer system and the acquiring bank computer system a recommendation of denial of the payment card EFT transaction.

In embodiments, the instructions may also cause the one or more computer processors to, responsive to a determination that the fraud level exceeds the predetermined threshold fraud level, transmit to a mobile phone application on a user computing device of the one of the plurality of card holders, a message indicating a required use of a secure method for performing the new payment card EFT transaction. In an embodiment, the instructions, when executed by the one or more computer processors, may further cause the one or more computer processors to responsive to a determination that the fraud level exceeds the predetermined threshold fraud level, transmit to the acquiring bank computer system, for transmission to a merchant computer system, a message indicating a required use of a secure method for performing the new payment card EFT transaction.

In embodiments, a computer-implemented method may comprise storing, by one or more computer processors in a data warehouse, a plurality of payment card EFT transaction data records for a plurality of payment card EFT transactions for a plurality of card holders, wherein each of the plurality of payment card EFT transaction data records corresponds to a payment card EFT transaction and includes data indicative of a payment card EFT transaction type for the payment card EFT transaction. The method may further include providing, by the one or more computer processors, a payment card security application programming interface (API) for providing a partner entity computer system access to payment card security score data, and receiving, by the one or more computer processors from the partner entity computer system via the payment card security API, user identification data for one of the plurality of card holders. Responsive to receipt of the user identification data, the method may include retrieving, by the one or more computer processors from the data warehouse, one or more payment card EFT transaction data records corresponding to the one of the plurality of card holders; and determining, by the one or more computer processors for each of the retrieved payment card EFT transaction data records based on the data indicative of the payment card EFT transaction type for the payment card EFT transaction, a security level associated with the payment card EFT transaction. The method may also include generating, by the one or more computer processors based on the determined security level for each of the retrieved payment card EFT transaction data records, a security score for the one of the plurality of card holders. The partner entity computer system may provide the user identification data for the one of the plurality of card holders to the payment card security API responsive to receipt of a request for authorization of a new payment card EFT transaction for the one of the plurality of card holders. In embodiments, the partner entity computer system may determine whether to approve or deny the new payment card EFT transaction based upon the security score for the one of the plurality of card holders provided via the payment card security API.

BRIEF DESCRIPTION OF THE DRAWINGS

FIG. 1 is a schematic diagram illustrating an exemplary multi-party payment card system in which some embodiments may be implemented.

FIG. 8 is an exemplary graphical user interface which displays payment card security information.

DETAILED DESCRIPTION

Figure 2:
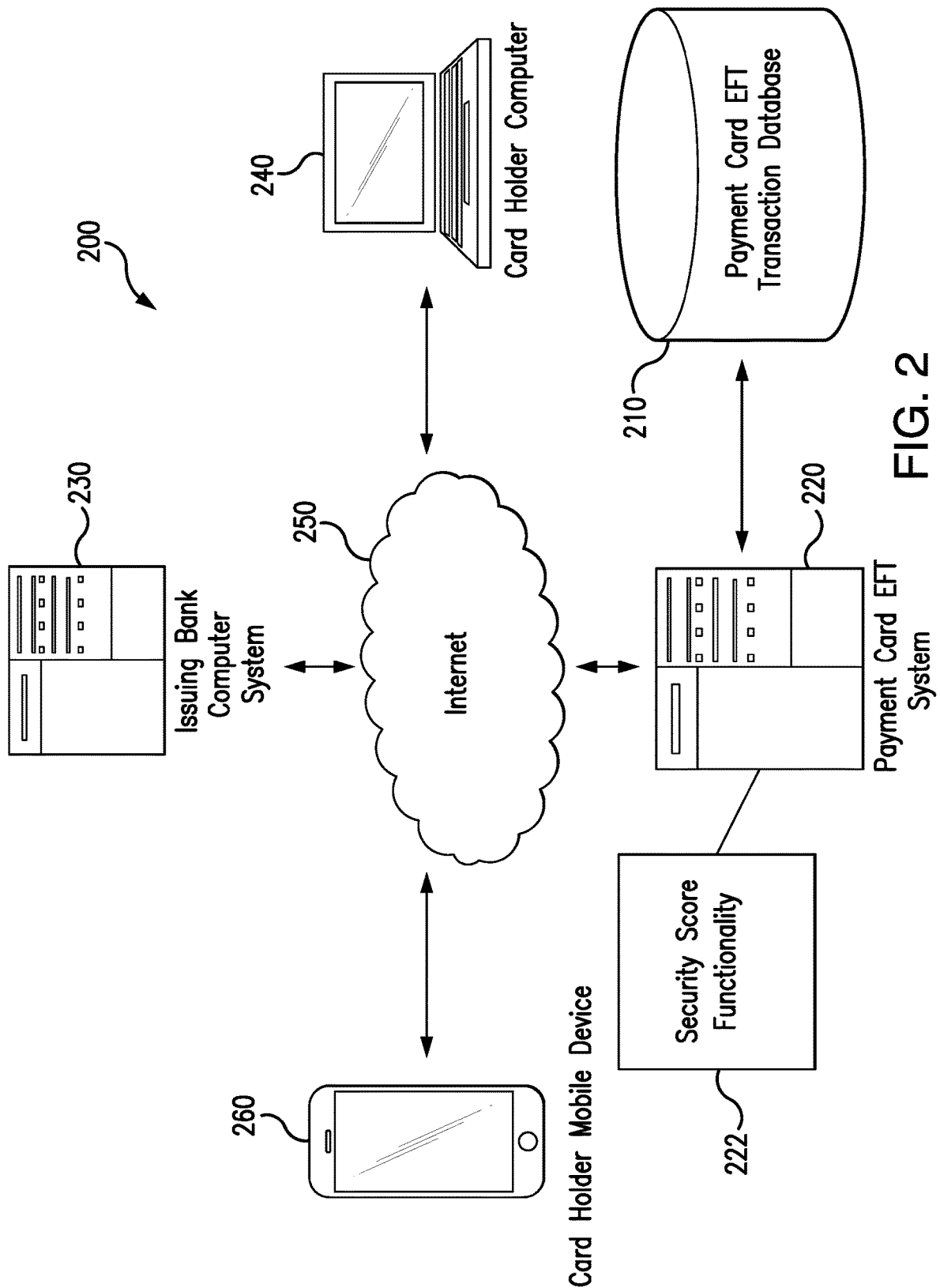
FIG. 2 is a functional block diagram of a data processing system for a payment card service provider in accordance with an exemplary embodiment.

Disclosed herein are processor-executable methods, computing systems, and related processing directed to technological improvements for enhancing usage of secure methods for conducting payment card electronic fund transfer (EFT) transactions. Technological developments in the field of payment card networks and data security have made available secure data depositories of payment card EFT transaction data accessible for analysis. Analysis may be performed on such data depositories to identify low usage of secure payment card EFT transaction methods by card holders, so that measures may be taken to increase secure usage.

In connection with identifying low usage of higher security payment card EFT transaction methods by card holders, a technical challenge arises in informing card holders of their usage. Typically, payment card EFT transactions are routed from a merchant computing system to an acquiring bank computer system, to a payment card network, and then to an issuing bank, as shown in FIG. 1. The current payment card EFT transaction process does not provide an opportunity for a user to be informed of more secure methods of conducting a payment card EFT transaction. In embodiments, the present claims recite a system which is configured to provide, in a number of different ways, the card holder with notification of more secure methods of conducting payment card EFT transactions.

It is to be understood that a payment card is a card that can be presented by the cardholder (i.e., customer) to make a payment. By way of example, and without limiting the generality of the foregoing, a payment card can be a credit card, debit card, charge card, stored-value card, or prepaid card or nearly any other type of financial transaction card. It is noted that as used herein, the term "customer", "cardholder," "card user," and/or "card recipient" can be used interchangeably and can include any user who holds a payment card for making purchases of goods and/or services. Further, as used herein in, the term "issuer" or "attribute provider" can include, for example, a financial institution (i.e., bank) issuing a card, a merchant issuing a merchant specific card, a stand-in processor configured to act on-behalf of the card-issuer, or any other suitable institution configured to issue a payment card. As used herein, the term "transaction acquirer" can include, for example, a merchant, a merchant terminal, an automated teller machine (ATM), or any other suitable institution or device configured to initiate a financial transaction per the request of the customer or cardholder.

A "payment card processing system," "credit card processing network," "payment card EFT processing system," and "credit card EFT processing network," such as the Mastercard® network allows consumers to use payment cards issued by a variety of issuers to shop at a variety of merchants. (Mastercard is a registered trademark of Mastercard International Incorporated located in Purchase, N.Y.). With this type of payment card, a card issuer or attribute provider, such as a bank, extends credit to a customer to purchase products or services. When a customer makes a purchase from an approved merchant, the card number and amount of the purchase, along with other relevant information, are transmitted via the processing network to a processing center, which verifies that the card has not been reported lost or stolen and that the card's credit limit has not been exceeded. Pre-paid and debit cards may also be processed by the processing network. In some cases, the customer's signature is also verified, a personal identification number is required or other user authentication mechanisms are imposed. The customer is required to repay the bank for the purchases, generally on a monthly basis. Typically, the customer incurs a finance charge, for example, if the bank is not fully repaid by the due date. The card issuer or attribute provider may also charge an annual fee.

As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Referring now to FIG. 1, there is shown a schematic diagram illustrating an exemplary multi-party payment card EFT system 100 in which some embodiments may be implemented. Payment card system 100 may be a credit card payment system using the Mastercard® payment card system payment network 120. Such electronic fund transfer (EFT) payment networks are also referred to as interchanges and interchange networks, and provide for transmission of messages compliant with an applicable interchange message specification, such as ISO 8583. The messages may be of variable length, and may include a Message Type Indicator field, which may specify a version of the applicable standard, a message class, a message function and message origin, and may be a 4 digit numeric field. The following field may be a bitmap that indicates which other data elements or data element subfields will be present. Data fields may include, but are not limited to, a primary account number field, a transaction amount field, a transmission date and time field, a time field, a date field, an expiration date field, a merchant type field, an acquiring institution identification code field, a forwarding institution identification code field, a card acceptor terminal identification field, a card acceptor identification code field, a card acceptor name/location field, a Point-of-Sale (POS) Data Code, and Point-of-Sale (POS) Entry Mode. The data fields may also include fields used in relation to tokenized transactions, such as, but not limited to, a payment token field, a token expiry date field, a token requestor ID field, a token assurance method field, and a token cryptogram field. Mastercard® payment card system electronic fund transfer payment network is a proprietary communications standard promulgated by Mastercard International Incorporated® for the exchange of financial transaction data between financial institutions that are members of Mastercard International Incorporated®.

In payment card system 100, an issuer or issuing bank computer system (e.g., a financial institution computer system) 125, termed an issuer or issuing bank, has issued a payment account card, such as a credit card account or a debit card account, to a cardholder. Merchants have established accounts with financial institutions that are termed acquirer or acquiring bank in the transaction system. A transaction commences when a cardholder 105 tenders a payment card, or a token corresponding to a payment card, to merchant system 110 for payment. Card information is captured by merchant devices, such as a point of sale dedicated device via swiping of a card, via a secure Internet connection, or via another technique such as communication with an NFC (near-field communication) chip or an EMV (Europay®, Mastercard®, and Visa®) chip in the card, or by communication of a token to the merchant device, such as from a mobile device of a purchaser or by provision of the token by the purchaser from an online wallet, for an online purchase. The merchant system transmits an electronic funds transfer (EFT) payment card transaction message via a secure communications channel to credit card processing computer systems of acquiring bank 115. The credit card processing computer systems of acquiring bank 115 then transmit a message requesting transaction approval to a payment card processing system authorization network 120. The payment card processing system authorization network in turn determines the issuing bank and transmits a message requesting transaction approval to the credit card processing computer system of the issuer bank 125. The issuer bank payment card processing computer systems determine whether to approve the transaction, by determining whether the credit limit is sufficient, and whether any of the data included in the message requesting approval is indicative of fraud. The issuer bank payment card processing computer systems then provide a return message to the acquiring bank through the payment card processing system authorization network. The return message may indicate approval of the transaction, declining of the transaction, and optionally other messages with declining of the transaction, such as an instruction to hold the card. When the message is routed through the payment card processing system authorization network, the payment card processing system authorization network then transmits the message to the acquirer computer system. The payment card processing system also stores data indicative of the approved transaction message in a database of approved payment card EFT transactions. A message including approval is then transmitted from the acquiring bank system to the merchant point of sale device or other merchant systems.

The request from the merchant 110 to the acquiring bank 115 may be performed over a wired or wireless communication channel such as a telephone, as an alternative to the use of a dedicated point-of-sale or point-of-interaction terminal, which reads the cardholder's account information from the magnetic stripe on the payment account card or EMV chip and communicates electronically with the transaction processing computers of acquiring bank 115. Alternatively, acquiring bank 115 may authorize a third party to perform EFT transaction processing on its behalf. In this case, the point-of-interaction terminal will be configured to communicate with the third party. Such a third party is usually called a "merchant processor" or an "acquiring processor." In some cases, as for cardholder authorized recurring payments, a merchant stores payment card information associated with a cardholder and generates a message requesting authorization from acquiring bank 115 using the stored payment card information, on a recurring basis. Such transactions are referred to as card-on-file (COF) transactions.

When a request for authorization is accepted, the issuer bank systems engage in certain steps. At an appropriate time, the available credit line or available balance of the cardholder's account is decreased. In certain situations, a charge is not posted immediately to a cardholder's account because bankcard associations, such as Mastercard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-interaction terminal. If a cardholder cancels a transaction before it is captured, a "void" is generated. If a cardholder returns goods after the EFT transaction has been captured, a "credit" is generated.

For PIN (personal identification number) debit card EFT transactions, when a request for authorization is approved by the issuer, the cardholder's account is decreased. Normally, a charge is posted immediately to cardholder's account. The bankcard association then transmits the approval to the acquiring processor for distribution of goods/services, or information or cash in the case of an ATM.

After a transaction is captured, the EFT transaction is cleared and settled between merchant system 110, acquiring bank system 115, and issuer system 125. Clearing refers to the communication of financial data for reconciliation purposes between the parties. Settlement refers to the electronic transfer of funds between the merchant's account, acquirer, and issuer related to the transaction.

Referring now to FIG. 2, there is shown a functional block diagram of an EFT network including devices operative to perform data processing system for a payment card service provider in accordance with an exemplary embodiment. Payment card EFT transaction database 210, which may be stored in a data warehouse, is shown. Database 210 includes one or more logical databases, stored on a plurality of data storage devices at one or more physical locations. Payment card EFT transaction database 210 may include tens of millions of records of payment card EFT transactions, for a plurality of card holders.

Payment card computer or server 220, which may comprise the payment card EFT network server, includes functionality 222 for analyzing transaction data to identify security levels for individual transactions and to generate an overall security score for a card holder. Functionality 222 may be implemented in software computer logic or firmware, for example.

Payment card computer or server 220 is in communication via one or more networks, such as Internet 250, with issuing bank computer system or server 230, user-accessible device 240, and mobile user device 260. User-accessible device 240 and user mobile device 260 may be accessible to both the payment card computer or server 220 and the issuing bank computer system 230, by the Internet 250. By way of example, the issuing bank computer system may be configured to transmit messages or user interfaces to devices 240 and 260, such as messages to a banking application on mobile device 260. By way of further example, the EFT payment card computer or server 220 may be configured to transmit messages to a payment application (e.g., Apple Pay, Android Pay) on the mobile device 260. Communications between the issuing bank computer 230 and the payment card computer or server may be via one or more application programming interfaces (API).

Figure 3:
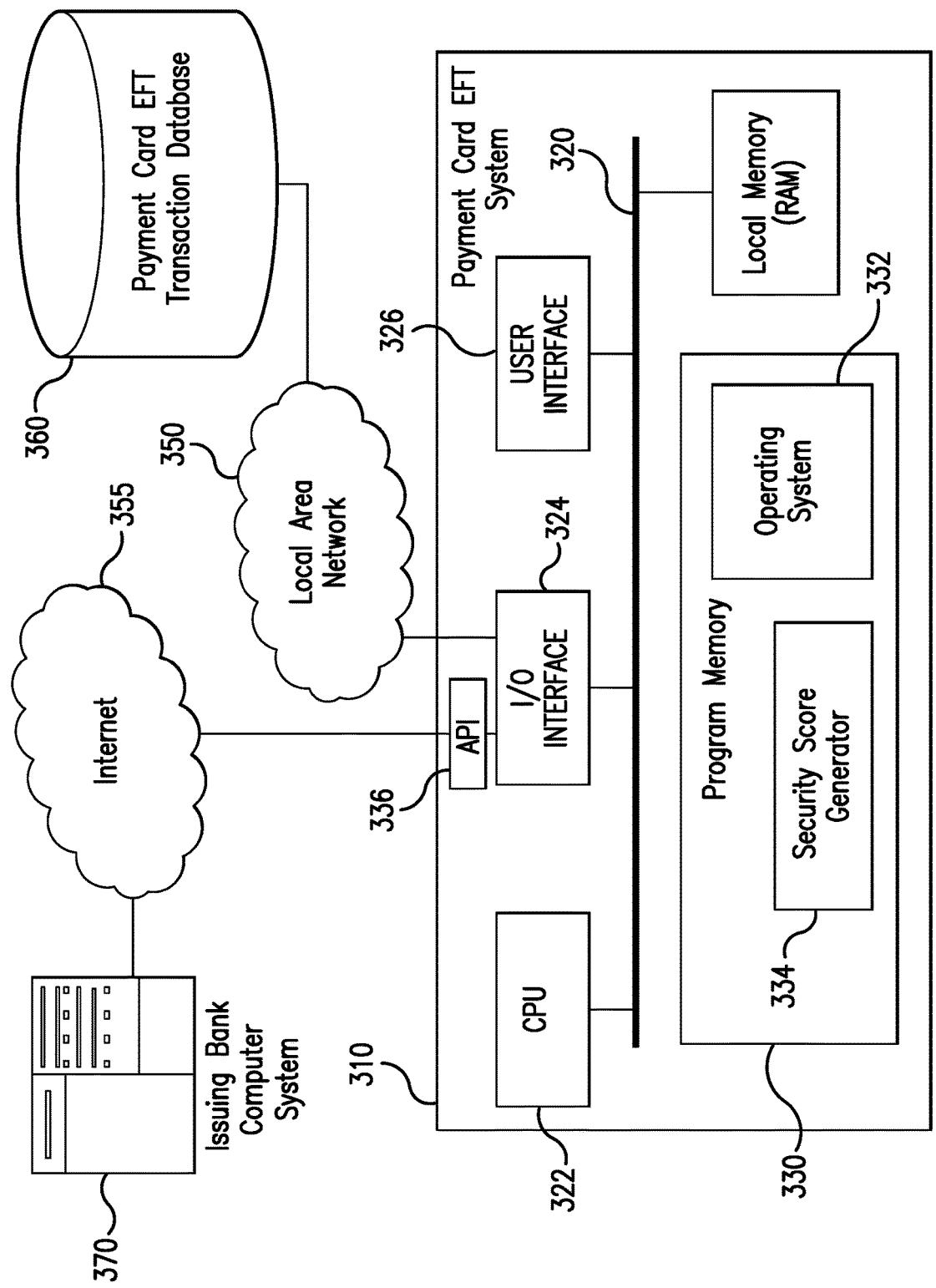
FIG. 3 illustrates an exemplary expanded block diagram of an embodiment of a server architecture of a payment card service provider system in accordance with an exemplary embodiment.

Referring now to FIG. 3, there is shown an expanded block diagram of a server architecture of the analytics system in accordance with some embodiments. Network server 310 includes exemplary data bus 320 providing communication among system components. One or more computer processors, designated by central processing unit (CPU) 322, are in communication via data bus 320 with components including program memory 330, local memory 328, user interface 326, and input/output interface 324. Program memory 330 stores programs including an operating system (OS) 332, which manages the computer hardware and provides common services for efficient execution of various logic circuitry including hardware, software and/or programs. Program memory 330 further stores application software. The application software includes security data analysis tool 334, which includes computer-executable instructions to determine the security level of individual transactions, and to determine an overall security score for a card holder based on the card holder's transactions. In embodiments, the score is based on a limited set of the card holder's transactions, such as transactions over a predetermined time period, such as the last 60 days. Program memory 330 further may include a device communication management program, which includes computer-executable instructions to manage communications, particularly communications with other computer systems and resources, such as payment card EFT transaction database 360, which may be stored in a data warehouse, and the acquiring bank server and the issuing bank server (not shown). The processor 322 (or CPU) carries out the instructions of computer programs stored in a memory unit, and operates and/or controls at least a portion of the functionality of the network server. Program instructions may be loaded into local memory 328 for efficient and high-speed execution by CPU 322. Programs may be arranged in one or more modules, and functionality of programs may be implemented in program code that may be arranged as one or more programs or modules, which need not be stored on a same memory device, or executed by a single CPU. In embodiments, network server 310 may encompass a specially-configured server that is configured to generate security scores for payment card EFT transactions, which may be coupled to other payment card network components that facilitate the processing of payment card ETF transactions. In other embodiments, network server 310 may comprise an existing server used by the payment card provider to facilitate payment card electronic fund transfer (EFT) transactions, which is configured with additional functionality to perform scoring. The term "payment card EFT transaction system" refers to either embodiment.

Network server 310 further includes device input/output interface 324, which interfaces network server 310 with local area network 350 to connect for data interchange with payment card EFT transaction database 360, and via external networks, such as exemplary Internet 355, and with issuing bank computer server 370, via payment card security API 336. Data communications may also be accomplished from and/or to peripheral devices and networks operatively coupled to the system. Such networks may include exemplary local area network 350, which manages communications among devices within a card services provider system or third party system. Data storage devices and associated management systems, such as hardware and software for database management systems, may be coupled to local area network 350. Local area network 350 may further be coupled, via one or more intermediary communication devices, such as firewall systems and other access management systems, (not shown), to network 355, which may be or include the Internet, as well as other wired and/or wireless networks, to remote devices and remote systems such as issuing bank computer server 370. The I/O interface 324 may include an API 336 configured to accept and parse security analysis requests from issuing bank computer system 370 and pass those requests to CPU 322 for processing using instructions of stored programs, for analysis of data in the payment card EFT transaction database, which may be stored in a data warehouse, as well as for user permissions and verification, by way of example.

The program memory 330 may include one or more of any form of data storage device including but not limited to electronic, magnetic, optical recording mechanisms, combinations thereof or any other form of memory device capable of storing data. The CPU 322 may be in the form of one or more computer processors, or may be in such forms as a distributed computing system, a centralized computing system, a network server with communication modules and other processors, or nearly any other automated information processing system capable of executing instructions stored in program memory. The present systems may be embodied as a data warehouse or repository for storing, managing and processing volumes of payment transaction data such as a plurality of payment card EFT transaction data records.

Figure 4:
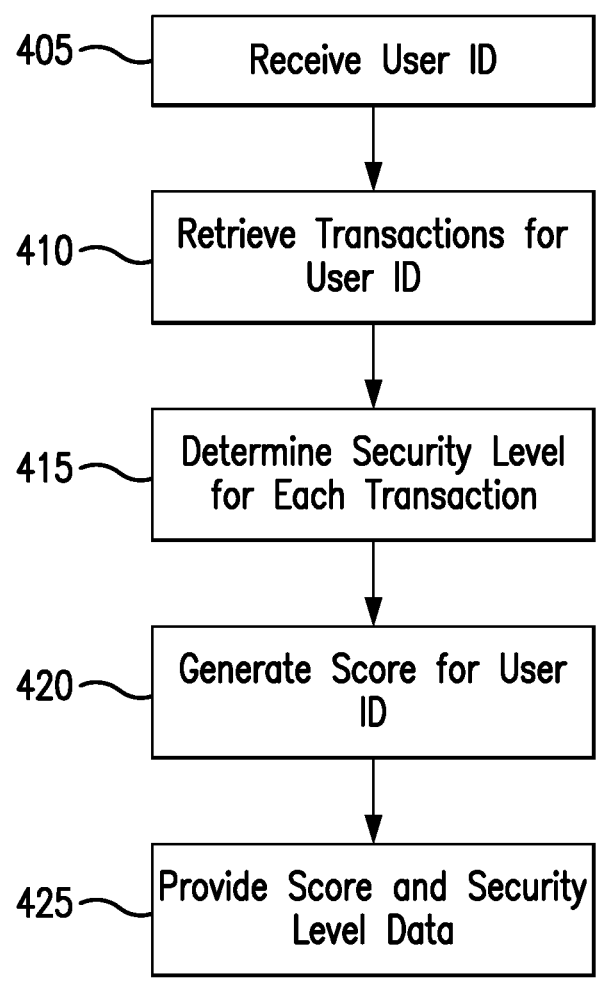
FIG. 4 illustrates an exemplary process flow diagram of a computerized method performed by the payment card network server useful in implementing some embodiments of the present system and method.

Referring now to FIG. 4, there is shown a flow diagram of an exemplary computer-implemented method or process flow performed by a payment card network server system according to some embodiments. The network server system receives, via the payment card security application programming interface (payment card security API) (336 in FIG. 3), user ID information (i.e., user identification data) for a card holder 405. In an embodiment, the payment card network server system may also receive a time period for which a security score is desired, such as, but not limited to, "last 30 days" or "last 60 days." The payment card network server system, after obtaining the user ID, and in embodiments a time period, may query the transaction database 410, which may be stored in a data warehouse, to obtain payment card EFT transaction records for transactions performed by the card holder who corresponds to the user ID. The query may be a select query in a Microsoft® Structured Query Language (SQL), or another suitable query language. The database then returns responsive data to the payment card network server system. The responsive data may include formatted data indicative of payment card EFT transactions, such as a table of Point of Sale Data Codes, Point of Sale Entry Mode Codes, Token Requestor Identifier Codes, Wallet Identifier Codes, date and time data, and amount data.

The responsive payment card EFT transaction data is then analyzed to determine a security level for each of the retrieved transactions 415. The payment card source for the transaction may be determined from the data transmitted with the request for authorization, such as the POS Data Codes, the POS Entry Mode Codes, the Token Requestor Identifier Codes, and the Wallet Identifier Codes. In an embodiment, the POS Entry Mode Codes can help determine the type of payment card EFT transaction performed, and may include the following exemplary field values:

00—Unknown
01—Manual/Key Entry
04—OCR Code Read
05—Integrated circuit card read—CVV data reliable (smart card)
07—Contactless M/Chip or Visa Smart Card read
10—Scanned MICR/check
79—Chip Card capable—manual PAN read (used for EMV fall back to manually entered)
80—Chip Card capable—unaltered track data read (used for EMV fall back to swipe)
82—Contactless Mobile Commerce device
85—Internet (not an ISO value)
90—Magnetic Stripe-CVV/CVC certified, unaltered Track Data (1 or 2) included in Authorization Request. Required to participate in PS/2000 or CPS/2000
91—Contactless magnetic stripe read
95—Integrated circuit card read—CVV data unreliable The above POS Entry Mode Codes are exemplary code values that may be used; other code values may be used in other embodiments. Further, the Token Requestor ID field may, in an embodiment, be used to determine whether the transaction was tokenized. Tokenized EFT transactions will include an appropriate data value in the Token Requestor ID field, indicating whether the token requestor is:

1—An Acquirer Token Requestor Type
2—A Card Issuer Token Requestor Type
3—A Merchant Token Requestor Type
4—A Third Party Wallet Token Requestor Type
5—A Payment Enabler Token Requestor Type
6—A Payment Intermediary Token Requestor Type
7—Payment Manager Token Requestor Type A non-tokenized transaction will not include the Token Requestor ID field in the data received for the transaction. As will be understood, other data fields transmitted to facilitate an electronic funds transfer payment card transaction may also or alternatively be used to determine what type of transaction was performed and whether the transaction was tokenized. For example, the Payment Account Reference field is another data field which is used with tokenized transactions and which may be used to determine whether a particular transaction is tokenized.

The transaction data transmitted with an EFT transaction may also include data that may be used to determine the type of payment card EFT transaction that was used. For example, the transaction data may indicate:

(1) Whether a token was used in place of an FPAN (Funding Primary Account Number). Use of a token is generally more secure than use of an FPAN. If a token was used, different token usages have different assurance levels. For example, a token transaction which includes some form of identity verification has a higher security level (i.e., has a higher assurance that the transaction is not fraudulent) than a token transaction which does not include identity verification. In embodiments, use of a token may require some type of issuer ID&V (Identity and Verification) such as input of a password (including a biometric password), or input of data to authenticate the transaction pursuant to the 3-D Secure (3DS) protocol, with or without step up, which is implemented in services such as Mastercard® SecureCode, Verified by Visa, American Express Safekey, or J/Secure.

(2) Whether the transaction included transmission of dynamic/cryptographic data to the merchant. Transactions which include transmission of dynamic/cryptographic data are considered more secure than transactions without such transmissions. Some merchants are able to accept dynamic/cryptographic data in relation to a payment card EFT transaction, such as DSRP (Digital Secure Remote Payments) cryptography which uses EMV-based cryptography, and UCAF (Universal Cardholder Authentication Field) authentication, which receives authentication data to authenticate payment card EFT transactions. Transactions which use DSRP cryptography are deemed more secure than transactions which use UCAF authentication. In "PIN bypass transactions," a cardholder may opt not to provide a PIN for authentication. PIN bypass transactions have a lower security level than transactions for which a PIN, or DSRP cryptography, is used.

(3) Whether a cardholder verification method was used during the transaction. Transactions which include cardholder verification are considered more secure than transactions without cardholder verification. In embodiments, different types of verification may be used including device-based authentication and issuer-based-verification. Current device-based authentication may include a fingerprint biometric scan, a facial scan, a pattern input, and a PIN (personal identification number) input. Current Issuer-based-verification includes input of a 3-D Secure password, input of a CVC (card verification code), input of a SSN (social security number), or input of a one-time password sent to the cardholder via SMS (short message service).

EFT payment card transactions may also differ by whether physical presence of the payment card is required for the transaction. In general, there are two types of payment card EFT transactions: (1) transactions in which the payment card is present, and (2) transactions in which the payment card is not present.

Transactions in which physical presence of the payment card is required because a physical feature of the card (i.e., the magnetic strip, the EMV (Europay®, Mastercard®, and Visa®) chip, or the NFC (near-field-communication) contactless chip) is used to conduct the transaction include:
  Physical magnetic swipe (including Mobile phone with MST (magnetic secure transmission capability))
  Physical card with EMV chip or NFC contactless chip
  Mobile phone NFC (near-field communications) contactless Transactions which may be conducted without physical presence of the payment card present include:
  Manually entering a Personal Access Number (PAN) and other card details into a merchant website or passing the PAN over the phone to a customer service representative or telephone computer system
  Using a tokenized digital wallet that requires authentication (like Apple Pay)/SRC (Secure Remote Commerce) tokens on the web A hierarchy of the security level of different types of payment card EFT transactions may be determined. In an embodiment, transactions from least secure to most secure may be ranked as follows:

| Security Level (from least secure to most secure) | Type of Transaction | Token Requestor ID | Wallet ID | POS Data (e.g. POS Entry Mode) |
|---|---|---|---|---|
| 1 (least secure) | Manually entering a Personal Access Number (PAN) and other card details into a merchant website or passing over the phone | None | None | 01 |
| 2 | Physical magnetic swipe (including Mobile phone with MST (magnetic secure transmission)) | None | None | 90 |
| 3 | Physical card with EMV chip or NFC contactless chip (non-tokenized) | None | None | 05/07 |
| 4 (most secure) | Mobile phone NFC contactless (tokenized) or Using a tokenized digital wallet that requires authentication (like Apple Pay/SRC tokens on the web | Yes | Yes | 82 |

In the above table, magnetic swipe transactions will not include a Token Requestor ID data field, and may be assigned a security level of 1. Other payment card EFT transaction types may or may not include a token Requestor ID data field, and may have security levels of 2-4 assigned to each of the methods of payment, as shown in the table. Manual entry of the Personal Access Number (PAN) may be considered the least secure transactions, and may be assigned a security level of 1. In contrast, tokenized digital wallet transactions, some of which may require authentication such as a biometric fingerprint scan or entry of a PIN, have a Token Requestor ID data field associated with them, and may be considered the most secure types of transactions, and may be assigned a security level of 4.

The payment card EFT transaction system may include a data storage device that stores the transaction data generated to execute the transaction, such as Point of Sale Codes (e.g., Point of Sale Entry Mode) and Token-related codes (e.g., Token Requestor Identifier and Wallet Identifier). These codes may be used to determine the type of payment card EFT transaction that was performed. A security level may be associated with each of the different types of payment card EFT transactions. As shown in the above table, the payment card EFT transaction types may, in an embodiment, be categorized into four different types: (1) a manual entry PAN transaction type; (2) a physical magnetic swipe transaction type; (3) a physical card with chip transaction type; (4) a mobile phone NFC transaction type or a tokenized transaction with authentication transaction type. The payment card EFT transaction types may also be categorized with more or less granularity. For example, tokenized transactions may be assigned different security levels depending on the type of authentication associated with the type of wallet used. In an embodiment, tokenized transactions which use biometric authentication may be considered to have a higher security level than tokenized transaction which use a PIN for authentication.

In embodiments, the data storage device may be configured to store first data indicative of payment card EFT transaction types that are associated with secure transactions and second data indicative of payment card EFT transaction types which are associated with insecure transactions. In an embodiment, the security level data and data indicative of which payment card EFT transaction types are associated with secure and insecure transactions may be stored in a table similar to the above table, in a data storage device. The payment card EFT transaction system may be configured to access the table in the data storage device to render determinations regarding the security level of transactions and determinations regarding whether certain transactions are considered secure or insecure.

The payment card EFT transaction computer system may also be configured to analyze each transaction that a card holder completes and determine from that transaction whether the transaction used a tokenized card number or not, and what device/wallet/source was used to make the transaction (Apple Pay, Android Pay, Samsung Pay, Citi Pay, Masterpass, etc.). In an embodiment, the determination of whether the transaction was tokenized may be based on Token Requestor Identifier Data and Wallet Identifier Data. In an embodiment, the Wallet Identifier Data may be used to identify which transactions required biometric authentication (e.g. Applepay transactions) and which transactions required PIN authentication (e.g., Google Pay set up for PIN authentication).

Generally, a tokenized transaction is more secure than a non-tokenized transaction. Connecting a tokenized card number to a device and/or merchant (card on file) is even more secure than just using a tokenized card at a merchant. Based on a number of security measures used when making the transaction (such as tokenization or connecting a tokenized card to a device), the payment card EFT transaction system can determine which of a card holder's transactions could have been more secure. For instance, if a card holder made a purchase online and did not use a tokenized card number, that transaction could have been made more secure by using a tokenized card. If a card holder made a purchase at a brick-and-mortar store using a plastic card rather than using Apple Pay and a tokenized card using biometric authentication, then that transaction could have been more secure.

As will be understood, the above list of transaction types may be further refined, so that, for example, different types of tokenized transactions have different transaction IDs and different security levels. In addition, other types of payment card EFT transactions may be implemented, including transactions of a type not yet in use today, which may have different levels of security associated with them for scoring according to embodiments of the disclosure.

After a security level for each of the transactions is determined, the process generates a security score for the card holder. In an embodiment, the generated security score may be based on a percentage of secure transactions performed over a certain time period. For example, if the time period is 2 months, over which the card holder has performed 10 payment card EFT transactions, 3 of which were secure transactions, the user's security score may be 30%. In this embodiment, only certain of the transactions in the hierarchy are deemed secure—for example, in an embodiment only transactions of security level 4 are considered secure for purposes of determining the percentage of secure transactions performed over a certain time, and transactions of security levels 1-3 are considered insecure. Taking the total number of payment card EFT transactions made by a card holder and determining how many of those transactions could have been made more secure, the payment card system can create a security score/profile for a card holder and can make recommendations for that card holder on how to make their less secure transactions more secure in the future.

Other methods may be used to calculate the security score for the card holder. For example, each transaction may be assigned a security level of 1-4, based upon the hierarchy table above. Then, the total score for all of the transactions may be calculated for the card holder, and divided by the total number of transactions to determine an average security score for all of the card holder's transactions under consideration. The security level may be represented by any type of numerical or alphanumeric scoring scale which can accurately represent the different levels of security. Other statistical measures, such as a median, mean, or other, may be employed to determine the security score.

Figure 9:
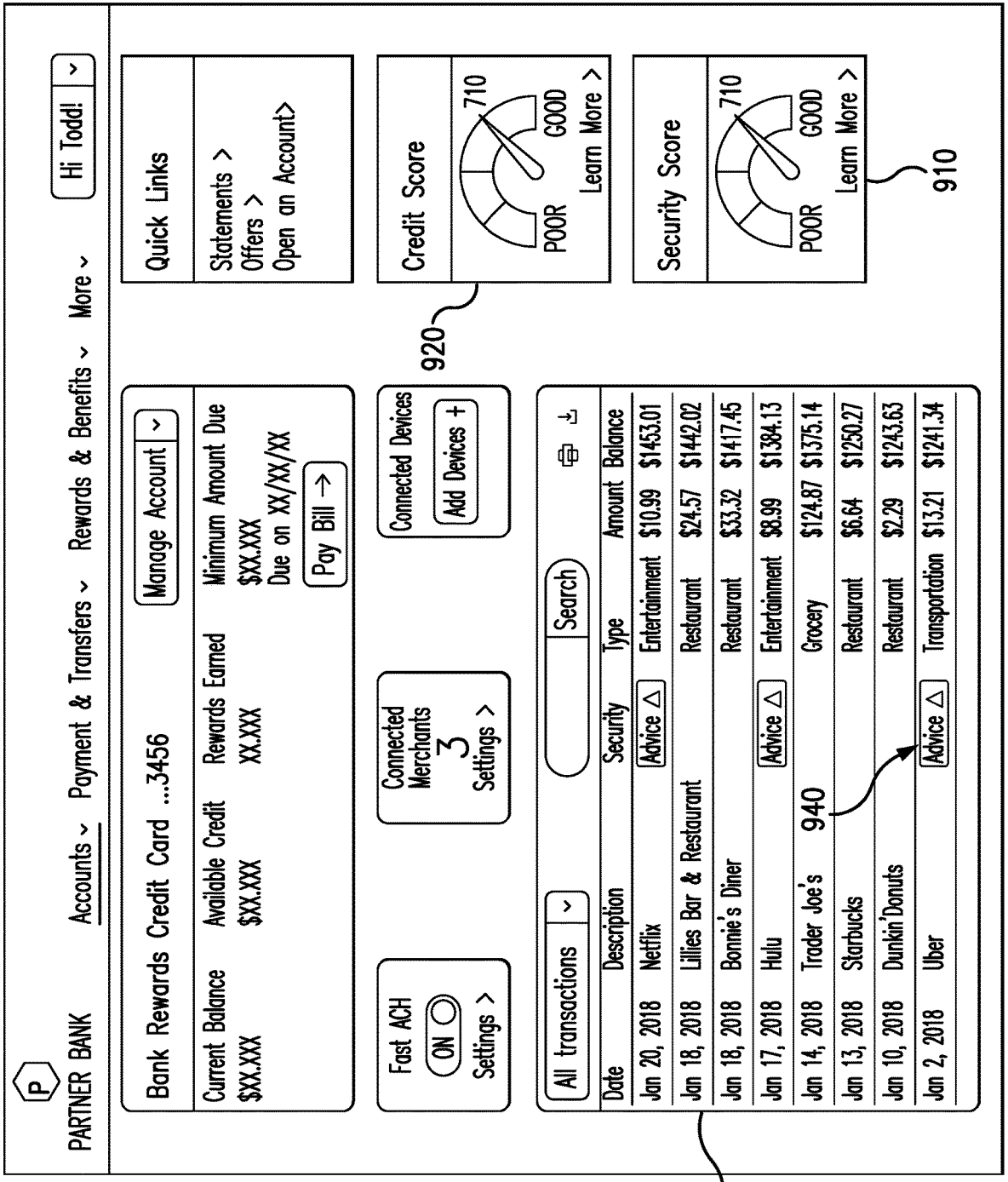
FIG. 9 is an exemplary graphical user interface which displays payment card security information.

In an embodiment, the calculated security score for the payment card EFT transactions may be normalized with respect to a known scoring system, to provide the user with a greater understanding of the meaning of the score. For example, the consumer credit score system is a well-known system which provides a score for individuals. Many consumers are generally aware that credit score range is from 300 to 850, and understand that a high score (e.g. 800) is indicative of having good credit. In an embodiment, the calculated transaction security score may be normalized so that it is based on a range of 300 to 850. Accordingly, when a card holder has a security score of 800, they will understand that they use good security practices, while card holders with a 400 score will understand that they use poor security practices. As shown in FIG. 9, the normalized security score may be presented in a graphical user interface which also includes the individual's credit score, which may further impress upon the card holder an understanding of the relative value of the security score.

At block 425, the security score, and in embodiments the transaction data for the transactions and the associated security level determined for each transaction, is provided to the API for capture by the issuing bank computer server. The issuing bank computer server may be configured to use the user's security score to determine whether to approve or deny future payment card EFT transactions by the user, as will be discussed in relation to FIG. 6.

Figure 5:
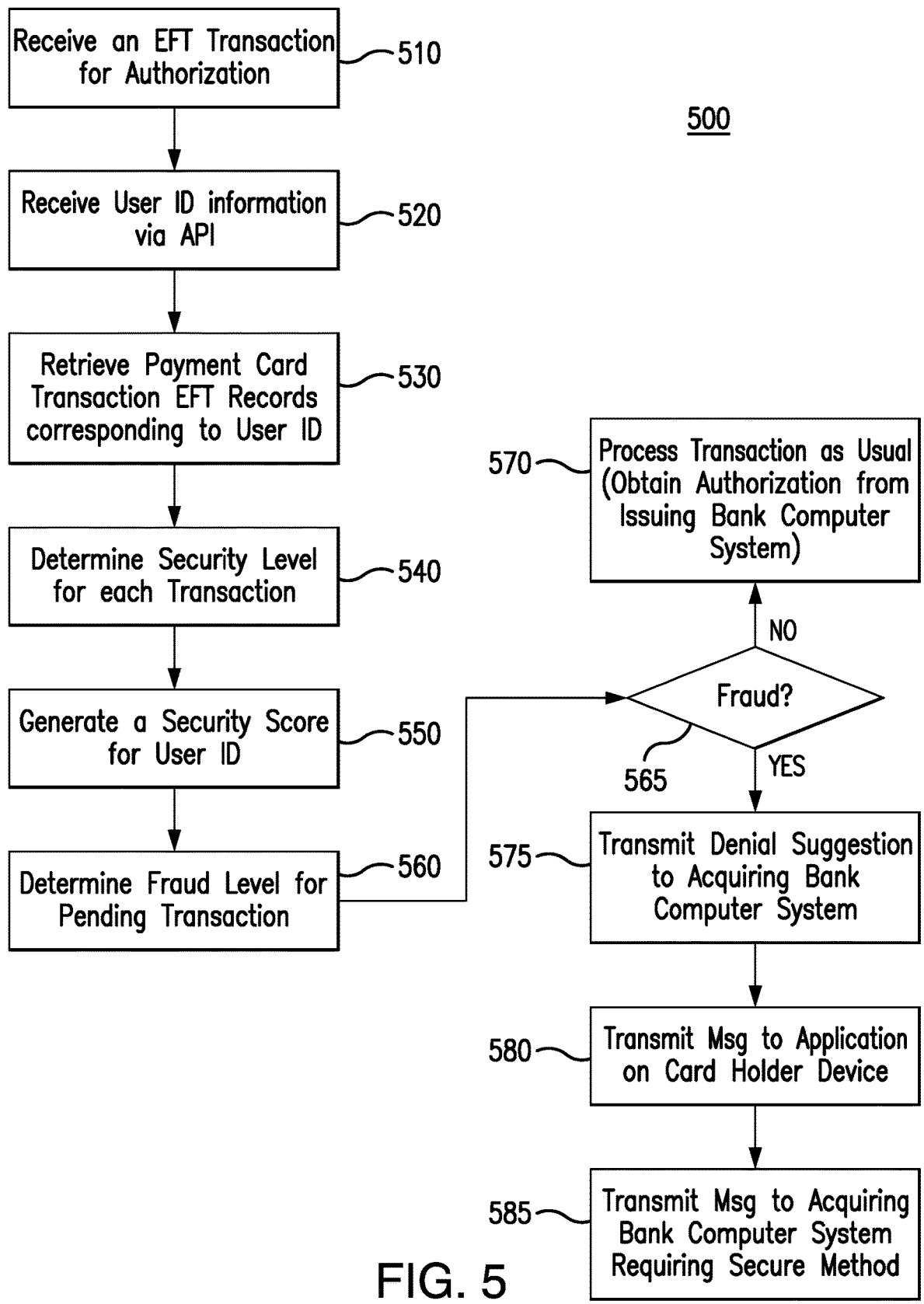
FIG. 5 illustrates an exemplary process flow diagram of a computerized method performed by the payment card network server useful in implementing some embodiments of the present system and method.

FIG. 5 depicts an embodiment in which the payment card network server process flow 500 may be configured to generate fraud alerts for transmittal to the issuing bank computer system and/or the payment card network server may be configured to deny transactions based upon the security score. While it is conventional for the issuing bank computer system to generate the authorization decision, in an embodiment the payment card network server may be configured to provide the issuing bank computer system with notice of potential fraud. At block 510, the payment card EFT network server may receive a transaction for authorization (i.e., to approve or deny). As noted, the transaction message may be compliant with an applicable interchange message specification such as ISO 8583 or the EMV Payment Tokenization Specification, and may include data fields such as primary account number, transaction amount, transmission date and time, time, date, expiration date, merchant type, acquiring institution identification code, forwarding institution identification code, card acceptor terminal identification, card acceptor identification code, card acceptor name/location, Point of Sale Codes (e.g., Point of Sale Entry Mode), and Token-related codes (e.g., Token Requestor Identifier and Wallet Identifier) for the transaction. At block 520, the payment card network server receives, via the API, user ID information for a card holder. As noted, in an embodiment, the payment card network server system may also receive a time period for which a security score is desired, such as, but not limited to, "last 30 days" or "last 60 days." The payment card network server system, after obtaining the user ID, and in embodiments a time period, may query the transaction database 530 to retrieve payment card EFT transaction records for transactions performed by the card holder who corresponds to the user ID. The database then returns responsive data, the retrieved payment card EFT transaction data records, to the payment card network server system. The responsive data may include formatted data indicative of payment card EFT transactions, such as a table of date and time data and amount data. At block 540, the responsive payment card EFT transaction data is then analyzed to determine a security level for each of the transactions. As noted, the security level may be based on the Point of Sale Codes (e.g., Point of Sale Entry Mode) and Token-related codes (e.g., Token Requestor Identifier and Wallet Identifier) for the transaction. After a security level for each of the transactions is determined, at block 550 a security score may be generated for the card holder.

At block 560, the payment card network server may be configured to determine a fraud level associated with the new payment card EFT transaction, which, in embodiments, may be based upon the security level associated with the new payment card EFT transaction and the security score for the card holder. At block 565, the process flow may take different paths depending on whether the transaction has a high fraud level which exceeds a predetermined threshold, or whether the transaction has a low fraud level which is less than the predetermined threshold. When the fraud level is low, the process flows to block 570, where the transaction is processed as usual, with the payment card network server requesting authorization from the issuing bank computer system. When the security score indicates a fraud level that exceeds the predetermined threshold fraud level, the process flows to block 575, where the payment card network server may be configured to transmit to the acquiring bank computer system a recommendation of denial of the transaction.

In addition, in embodiments, at block 580, responsive to a determination that the fraud level exceeds the predetermined threshold fraud level, the payment card network server may be configured to transmit to an application on a user computing device (such as a mobile device or other computing device) of the card holder, a message indicating a suggested or required use of a secure method for performing the new payment card EFT transaction. The application may comprise a payment card application or other application on the user's device. For example, the user may have a Mastercard® mobile phone application on their mobile phone, to which the message could be sent. In another embodiment, the user may have an app provided by the Issuing Bank (the bank that issued the payment card), and the system may be configured to provide a message to the Issuing Bank Computer system, which may then transmit the message to Issuing Bank app.

In another embodiment, at block 585, responsive to a determination that the fraud level exceeds a predetermined threshold fraud level, the payment card network server may be configured to transmit to the acquiring bank computer system, for transmission to the merchant computer system, a message suggesting or requiring use of a secure method for performing the new payment card EFT transaction.

The level of fraud associated with a new transaction can be determined in a number of different ways. In an embodiment, the fraud level may be determined based on the determined security level for the pending payment card EFT transaction and the security score generated for the user ID, based upon a set of transactions. For example, an extremely low security score for a card holder performing the transaction and a low security level for the pending transaction may result in a high fraud level determination for the transaction. Conversely, an extremely high security score for the card holder performing the transaction and a high security level for the transaction may result in a low fraud level determination for the transaction. In another embodiment, data records indicating that whether prior fraudulent transactions had previously been submitted using the card holder's card may be used to determine the fraud level for the transaction. Other factors may be used to determine a level of fraud associated with a transaction, and in embodiments a weighted average of different factors may be used to determine a level of fraud.

The payment card network server (or payment card EFT transaction computer) may alternatively or additionally be configured to assess a level of fraud associated with a pending transaction using behavioral analysis. For example, if the transaction records corresponding to the user ID indicates that the user always performs secure transactions, but the pending transaction is insecure, the system may be configured to assign a high level of fraud to the pending transaction. However, if the transaction records indicate that the user always performs insecure transactions, but the pending transaction is secure, the system may be configured to assign a low level of fraud to the transaction because of the increase in security level of the pending transaction compared to the security level of previous transactions performed by the user.

Figure 6:
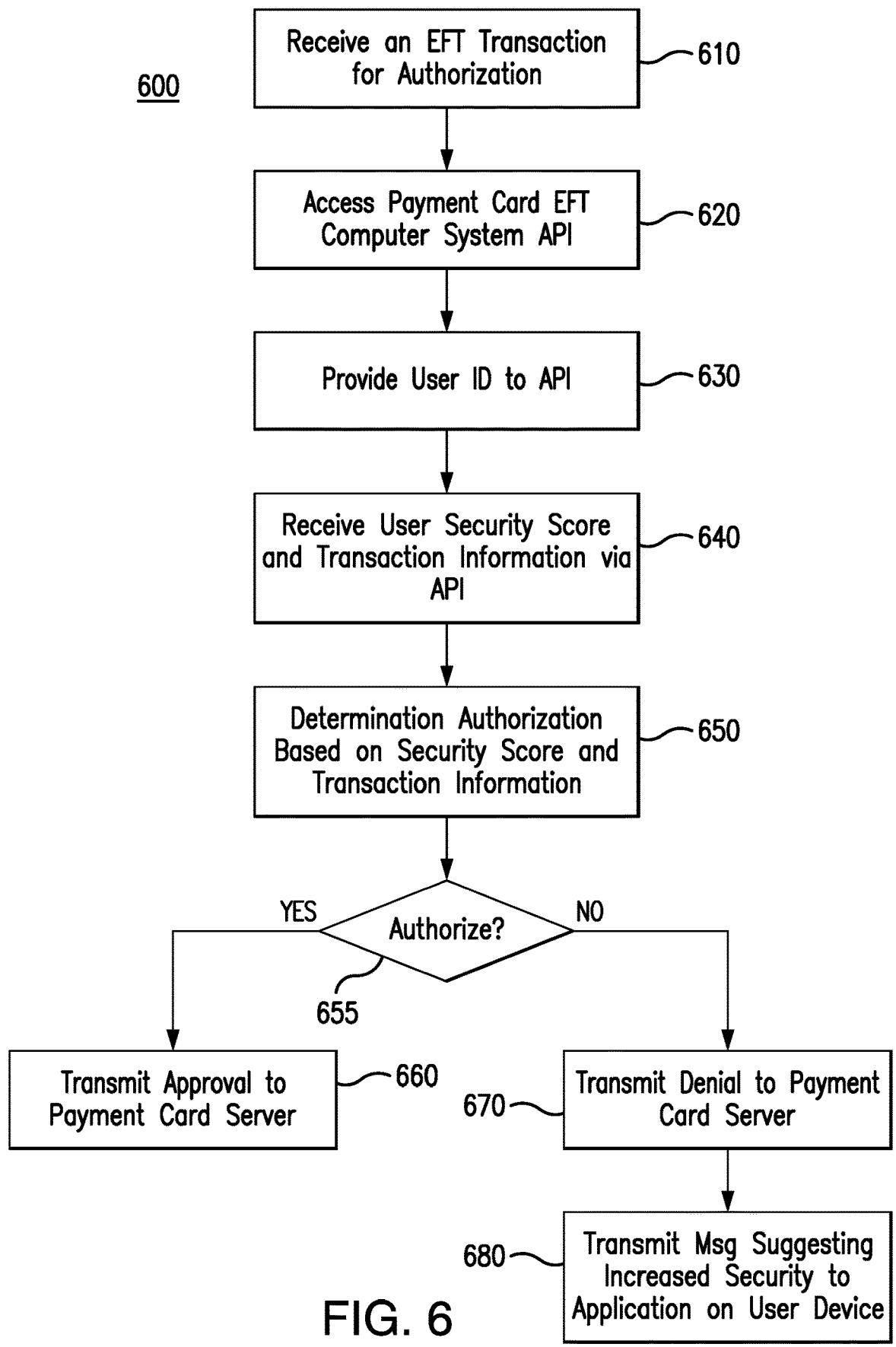
FIG. 6 illustrates an exemplary process flow diagram of a computerized method performed by the issuing bank server useful in implementing some embodiments of the present system and method.

FIG. 6 depicts a process flow of an exemplary method that may be performed by the issuing bank computer server using the scoring data provided to it by the payment card security API. In embodiments, the issuing bank computer server may be considered a partner entity computer system, with which a private API is established. This exemplary method may be performed by a payment card network server (also called a payment card EFT network server) executing instructions of a specialized tool, which tool may be in the form of computer-readable instructions. The process flow 600 commences following receipt by the issuing bank computer server of a request for authorization of a payment card EFT transaction by a card holder 610. At block 620, the issuing bank computer server accesses the payment card network server API, and at block 630 the issuing bank computer server provides a user ID to the API. In an embodiment, the issuing bank computer server may also provide to the API a time period (e.g., last 60 days) for which a score is desired. At block 640, the issuing bank computer server receives from the payment card network server a security score for the card holder corresponding to the user ID provided. In embodiments, the API may also provide to the issuing bank computer server transaction data upon which the score was based. For example, the data may include dates of transactions, the amounts purchased, and the merchants from whom the purchases were made. In addition, the API may also provide security level data for individual transactions.

Upon receipt of the user security score, transaction data, and security level data for individual transactions, at block 650 the issuing bank computer server may be configured to use the data to render an authorization decision for the pending payment card EFT transaction. In an embodiment, the issuing bank computer may be configured to apply algorithms or rules to determine whether to authorize a transaction based upon the security score, the security of the pending transaction, the amount of the transaction, and the particular merchant involved in the transaction, if other rules employed by the issuing bank are not violated, e.g., the value of the transaction does not exceed the user's limit and the card holder's account is in good standing (e.g., the user's card has not been reported stolen or payments on the account are current). For example, the algorithm or rules may provide that transactions over a certain value are required to be performed using a secure method to be approved. Alternatively, the algorithm or rules may provide that transactions with certain merchants who have a history of fraudulent transactions must be secure transactions to be approved. By way of further example, the algorithm or rules may provide for approval of transactions for card holders with a predetermined high security score, and denial of transactions for card holders with a predetermined low security score.

The issuing bank computer may alternatively or additionally be configured to assess whether to authorize pending payment card EFT transactions using behavioral analysis. For example, if the transaction data indicates that the user always or usually performs high security level secure transactions, but the pending transaction is insecure, the system may be configured to deny the transaction. However, if the user always or usually performs low security level insecure transactions, but the pending transaction is secure, the system may be configured to approve the transaction because of the increase in security level of the pending transaction. Different issuing banks may use different behavioral analysis.

At block 665, the process flow splits based on whether the transaction is authorized. When the issuing bank computer server determines, based upon the score and transaction data that the pending transaction should be approved, the issuing bank computer server transmits a message to the payment card network server (payment card EFT network server) indicating the approval of the transaction for which authorization was sought 660. When the issuing bank computer server determines, based upon the score and transaction data that the pending transaction should be declined, the issuing bank computer server transmits a message to the payment card network server indicating the rejection of the transaction 670. In embodiments, the issuing bank may also be configured to transmit a message to a banking or credit card application on a mobile device of the card holder 680. In an embodiment in which the transaction is rejected because of the low security of the payment method, the message may include information indicating that the user of a higher level security payment method may increase the possibility that the transaction will be approved.

Figure 7:
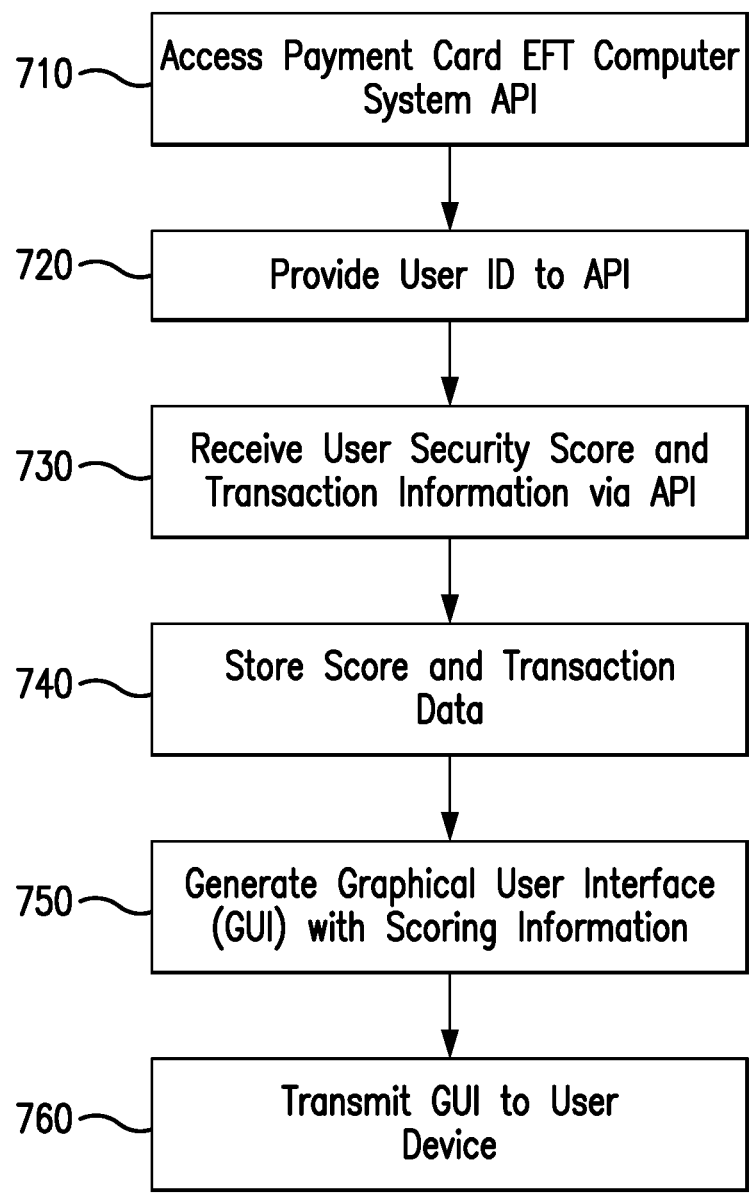
FIG. 7 illustrates an exemplary process flow diagram of a computerized method performed by the issuing bank server useful in implementing some embodiments of the present system and method.

FIG. 7 depicts a process flow of another exemplary method that may be performed by the issuing bank computer server using the scoring data provided to it by the payment card server system API. In this embodiment, the process flow 700 may commence without the receipt of a request for authorization. Rather, the process flow is initiated to obtain information for a graphical user interface that will be provided to the card holder which includes security data. At block 710, the issuing bank computer server accesses the payment card network server API, and at block 720 the issuing bank computer server provides a user ID to the API. In an embodiment, the issuing bank computer server may also provide to the API a time period (e.g., last 60 days) for which a score is desired. At block 730, the issuing bank computer server receives from the payment card network server (payment card EFT network server) a security score for the card holder corresponding to the user ID provided. In embodiments, the API may also provide to the issuing bank computer server transaction data upon which the score was based. For example, the data may include dates of transactions, the amounts purchased, and the merchants from whom the purchases were made. In addition, the API may also provide security level data for individual transactions.

Upon receipt of the user security score, transaction data, and security level data for individual transactions, at block 740, the issuing bank computer server may be configured to store the score data and transaction data for the payment card EFT transactions. At block 750, the issuing bank computer server may be configured to generate graphical user interfaces for display on card holder devices, such as smart phones, which include security information. For example, the graphical user interfaces may include the security score generated by the payment card network server, and in embodiments the graphical user interfaces may alternatively or additionally include security level information for individual transactions and summary information on secure versus insecure transactions performed by the card holder. At block 760, the graphical user interfaces are transmitted to a card holder's mobile device or other computing device.

FIG. 8 depicts an exemplary graphical user interface 800 which may be generated for a card holder by the issuing bank computer server. In an embodiment, the graphical user interface may include a security panel 810 which provides details regarding secure and insecure payment card EFT transactions performed by the card holder. Security panel 810 displays a number of data fields concerning the transactions performed by the card holder, the devices the card holder used to perform payment card EFT transactions, and an indication of how many of the transactions, of the total number of transactions, were secure. The "Devices" and "Connected Devices" field indicates devices that have the card holder's card number stored on them in the form of a token. The devices may include smart phones, smart watches, and voice assistants such as Amazon Alexa, Google Home, and Apple Homepod. The "Connected Merchant" field indicates the merchants which have saved card information (which may be tokenized or non-tokenized) for the card holder. The "SRC" field indicates a tokenized transaction conducted online. The graphical user interface may also include a listing of individual transactions 820. The listing may include security flags 830 for particular transactions, such as transactions that are insecure. For example, a flag may provide advice to the user to increase their security by performing similar transactions with the same merchant (who is known to accept secure methods) by a secure method in the future.

FIG. 9 depicts another exemplary interface 900 which may be generated for a card holder by the issuing bank computer server. In this embodiment, the graphical user interface may include a security score 910 which provides the user with a security score corresponding to the card holder's use of secure versus insecure payment card EFT transactions. The graphical user interface may also include a credit score panel 920 which provides the user with a credit score corresponding to the user. The presentation of the credit score panel provides the user with a reference, a credit score, which most users are familiar with, which the user can use to understand the security score. In the example shown in FIG. 9, the credit score and security score use similar scales, so the user can understand that a value which is good on the credit score scale is also good on the security score scale. The graphical user interface may also include a listing of individual transactions 930. The listing may include security flags 940 for particular transactions, such as transactions that are insecure. For example, a flag may provide advice to the user to increase their security by performing similar transactions with the same merchant (who is known to accept secure methods) by a secure method in the future.

The flow charts described herein do not imply a fixed order to the steps, and embodiments of the present disclosure may be practiced in any order that is practicable. In embodiments, one or more steps of the methods may be omitted, and one or more additional steps interpolated between described steps. Note that any of the methods described herein may be performed by hardware, software, or any combination of these approaches. For example, a non-transitory computer-readable storage medium may store thereon instructions that when executed by a processor result in performance according to any of the embodiments described herein. The instructions may be stored on one or more non-transitory computer-readable storage media, and may be in one or more modules. In embodiments, each of the steps of the methods may be performed by a single computer processor or CPU, or performance of the steps may be distributed among two or more computer processors or CPU's of two or more computer systems.

The embodiments described herein are solely for the purpose of illustration. Those in the art will recognize that other embodiments may be practiced with modifications and alterations limited only by the claims.

What is claimed is:

1. A computer system, comprising:
   one or more computer processors;
   a data warehouse containing a plurality of payment card electronic funds transfer (EFT) transaction data records for a plurality of payment card EFT transactions for a plurality of card holders, wherein each of the plurality of payment card EFT transaction data records comprises data generated during execution of a payment card EFT transaction including data indicative of a payment card EFT transaction method for the payment card EFT transaction, wherein the payment card EFT transaction method comprises one of a physical magnetic swipe transaction method, a physical card with chip transaction method, a manual entry PAN transaction method, a mobile phone NFC transaction method, and a tokenized transaction with authentication transaction method;
   a memory unit storing computer-executable instructions, which instructions, when executed by the one or more computer processors, cause the one or more computer processors to:
   provide a payment card security application programming interface (API) for providing a partner entity computer system access to payment card security score data;
   receive, from the partner entity computer system via the payment card security API, user identification data for one of the plurality of card holders;
   responsive to receipt of the user identification data, retrieve, from the data warehouse, one or more of the payment card EFT transaction data records corresponding to the one of the plurality of card holders;
   determine, for each of the retrieved payment card EFT transaction data records based at least in part on the data indicative of the payment card EFT transaction method for the payment card EFT transaction, one of a plurality of a security levels, associated with the retrieved payment card EFT transaction data record;
   generate, based on the determined security level for each of the retrieved payment card EFT transaction data records, a security score for the one of the plurality of card holders; and
   a data storage device configured to store a security level associated with each of the plurality of payment card EFT transaction methods;
   wherein the partner entity computer system is configured to provide the user identification data for the one of the plurality of card holders to the payment card security API responsive to receipt of a request for authorization of a new payment card EFT transaction for the one of the plurality of card holders,
   wherein the partner entity computer system is configured to determine whether to approve or deny the new payment card EFT transaction based upon the security score for the one of the plurality of card holders provided via the payment card security API;
   wherein determining, for each of the retrieved payment card EFT transaction data records, the security level associated with the payment card EFT transaction comprises accessing the data storage device to determine the security level associated with the data indicative of the payment card EFT transaction method for the payment card EFT transaction;
   wherein the data storage device further comprises first data indicative of payment card EFT transaction methods which are deemed secure transactions and second data indicative of payment card EFT transaction methods that are deemed insecure transactions;
   wherein generating the security score for one of the plurality of card holders based on the determined security level for each of the retrieved payment card EFT transaction data records comprises a memory unit including instructions which cause the one or more computer processors to:
   access the data storage device to determine for each payment card EFT transaction based on the data indicative of the payment card EFT transaction method for the payment card EFT transaction whether the payment card EFT transaction is deemed secure or insecure;
   determine a total number of payment card EFT transactions associated with the one of the plurality of card holders; and
   determine a first number of payment card EFT transactions of the total number of payment card EFT transactions which were secure and a second number of payment card EFT transactions of the total number of payment card EFT transactions which were insecure; and
   wherein the generated security score is based upon the first number of the payment card EFT transactions that were secure and the second number of the payment card EFT transactions which were insecure.

2. The computer system of claim 1, wherein the data indicative of the payment card EFT transaction method for the payment card EFT transaction comprises one or more of Point of Sale Entry Mode Data, Token Requestor Identifier Data, and Wallet Identifier Data.

3. The computer system of claim 1, wherein the partner entity computer system is configured to generate, for display on a user computing device, a graphical user interface including the security score.

4. The computer system of claim 1, wherein the instructions, when executed by the one or more computer processors, further cause the one or more computer processors to:
provide, via the payment card security API to the partner entity computer system, the determined security level for each of the retrieved payment card EFT transaction data records for the one of the plurality of card holders responsive to receipt of the user identification data from the partner entity computer system via the payment card security API;
wherein the partner entity computer system is configured to generate, for display on a user computing device based upon the determined security level for each of the retrieved payment card EFT transaction data records, a graphical user interface including data indicative of a number of secure and insecure transactions performed by the one of the plurality of card holders.

5. The computer system of claim 1, wherein the instructions, when executed by the one or more computer processors, further cause the one or more computer processors to:
receive, from an acquiring bank computer system, the request for authorization for the new payment card EFT transaction for the one of the plurality of card holders, wherein the request includes the data indicative of the payment card EFT transaction method for the new payment card EFT transaction;
determine, based on the data indicative of the payment card EFT transaction method for the new payment card EFT transaction, the security level associated with the new payment card EFT transaction;
determine, based upon the security level associated with the new payment card EFT transaction and the security score for the one of the plurality of card holders, a fraud level associated with the new payment card EFT transaction;
responsive to a determination that the fraud level exceeds a predetermined threshold fraud level, transmit to one of the partner entity computer system and the acquiring bank computer system a recommendation of denial of the payment card EFT transaction.

6. The computer system of claim 5, wherein the instructions, when executed by the one or more computer processors, further cause the one or more computer processors to:
responsive to a determination that the fraud level exceeds the predetermined threshold fraud level, transmit to a mobile phone application on a user computing device of the one of the plurality of card holders, a message indicating a required use of a secure method for performing the new payment card EFT transaction.

7. The computer system of claim 5, wherein the instructions, when executed by the one or more computer processors, further cause the one or more computer processors to:
responsive to a determination that the fraud level exceeds the predetermined threshold fraud level, transmit to the acquiring bank computer system, for transmission to a merchant computer system, a message indicating a required use of a secure method for performing the new payment card EFT transaction.

8. A computer-implemented method comprising:
storing, by one or more computer processors in a data warehouse, a plurality of payment card electronic fund transfer (EFT) transaction data records for a plurality of payment card EFT transactions for a plurality of card holders, wherein each of the plurality of payment card EFT transaction data records corresponds to a payment card EFT transaction and includes data indicative of a payment card EFT transaction method for the payment card EFT transaction, wherein the payment card EFT transaction method comprises one of a manual entry PAN transaction method, a physical magnetic swipe transaction method, a physical card with chip transaction method, a mobile phone NFC transaction method, and a tokenized transaction with authentication transaction method;
providing, by the one or more computer processors, a payment card security application programming interface (API) for providing a partner entity computer system access to payment card security score data;
receiving, by the one or more computer processors from the partner entity computer system via the payment card security API, user identification data for one of the plurality of card holders;
responsive to receipt of the user identification data, retrieving, by the one or more computer processors from the data warehouse, one or more payment card EFT transaction data records corresponding to the one of the plurality of card holders;
determining, by the one or more computer processors for each of the retrieved payment card EFT transaction data records based on the data indicative of the payment card EFT transaction method for the payment card EFT transaction, one of a plurality of security levels, associated with the payment card EFT transaction;
generating, by the one or more computer processors based on the determined security level for each of the retrieved payment card EFT transaction data records, a security score for the one of the plurality of card holders;
storing, in a data storage device, a security level associated with each of the plurality of payment card EFT transaction methods;
wherein the partner entity computer system provides the user identification data for the one of the plurality of card holders to the payment card security API responsive to receipt of a request for authorization of a new payment card EFT transaction for the one of the plurality of card holders,
wherein the partner entity computer system determines whether to approve or deny the new payment card EFT transaction based upon the security score for the one of the plurality of card holders provided via the payment card security API;
wherein determining, for each of the retrieved payment card EFT transaction data records, the security level associated with the payment card EFT transaction comprises accessing the data storage device to determine the security level associated with the data indicative of the payment card EFT transaction method for the payment card EFT transaction; and
storing, in the data storage device, first data indicative of payment card EFT transaction methods which are associated with secure transactions and second data indicative of payment card EFT transaction methods which are associated with insecure transactions;

wherein generating the security score for the one of the plurality of card holders based on the determined security level for each of the retrieved payment card EFT transaction data records comprises:
accessing the data storage device to determine for each payment card EFT transaction based on the data indicative of the payment card EFT transaction method for the payment card EFT transaction whether the payment card EFT transaction is deemed secure or insecure;
determining a total number of payment card EFT transactions associated with the one of the plurality of card holders;
determining a first number of payment card EFT transactions of the total number of payment card EFT transactions which were secure and a second number of payment card EFT transactions of the total number of payment card EFT transactions which were insecure; and
wherein the generated security score is based upon the first number of the payment card EFT transactions that were secure and the second number of the payment card EFT transactions which were insecure.

9. The computer-implemented method of claim 8, wherein the data indicative of the payment card EFT transaction method for the payment card EFT transaction comprises one or more of Point of Sale Entry Mode Data, Token Requestor Identifier Data, and Wallet Identifier Data.

10. The computer-implemented method of claim 8, wherein the partner entity computer system generates, for display on a user computing device, a graphical user interface including the security score.

11. The computer-implemented method of claim 8, further comprising:
providing, by the one or more computer processors via the payment card security API to the partner entity computer system, the determined security level for each of the retrieved payment card EFT transaction data records for the one of the plurality of card holders responsive to receipt of the user identification data from the partner entity computer system via the payment card security API;
wherein the partner entity computer system generates, for display on a user computing device based upon the determined security level for each of the retrieved payment card EFT transaction data records, a graphical user interface including a number of secure and insecure transactions performed by the one of the plurality of card holders.

12. The computer-implemented method of claim 8, further comprising:
receiving, by the one or more computer processors from an acquiring bank computer system, the request for authorization for the new payment card EFT transaction for the one of the plurality of card holders, wherein the request includes the data indicative of the payment card EFT transaction method for the new payment card EFT transaction;
determining, by the one or more computer processors based on the data indicative of the payment card EFT transaction method for the new payment card EFT transaction, the security level associated with the new payment card EFT transaction;
determining, by the one or more computer processors based upon the security level associated with the new payment card EFT transaction and the security score for the one of the plurality of card holders, a fraud level associated with the new payment card EFT transaction;
responsive to a determination that the fraud level exceeds a predetermined threshold fraud level, transmitting to one of the partner entity computer system and the acquiring bank computer system a recommendation of denial of the payment card EFT transaction.

13. The computer-implemented method of claim 12, further comprising:
responsive to a determination that the fraud level exceeds the predetermined threshold fraud level, transmitting to a mobile phone application on a user computing device of the one of the plurality of card holders, a message indicating a required use of a secure method for performing the new payment card EFT transaction.

14. The computer-implemented method of claim 12, further comprising:
responsive to a determination that the fraud level exceeds the predetermined threshold fraud level, transmitting to the acquiring bank computer system, for transmission to a merchant computer system, a message indicating a required use of a secure method for performing the new payment card EFT transaction.

* * * * *